(12) United States Patent
Cheng et al.

(10) Patent No.: US 8,594,168 B2
(45) Date of Patent: Nov. 26, 2013

(54) DIGITAL SIGNAL PROCESSOR WITH ADJUSTABLE DATA RATE AND METHODS THEREOF

(76) Inventors: Gary Cheng, Markham (CA); Vyacheslav Shyshkin, Etobicoke (CA); Steve Selby, Scarborough (CA)

( * ) Notice: Subject to any disclaimer, the term of this patent is extended or adjusted under 35 U.S.C. 154(b) by 0 days.

(21) Appl. No.: 13/408,011

(22) Filed: Feb. 29, 2012

(65) Prior Publication Data

US 2013/0223572 A1    Aug. 29, 2013

(51) Int. Cl.
*H04B 17/00*    (2006.01)

(52) U.S. Cl.
USPC ........... 375/225; 375/224; 375/227; 375/316; 375/340; 375/346; 375/355; 375/371; 455/130; 455/516; 370/335; 370/342; 370/516; 327/163; 327/551; 341/61; 341/155

(58) Field of Classification Search
USPC ......... 375/224, 225, 227, 316, 340, 346, 355, 375/371; 455/130, 516; 370/335, 342, 516; 327/163, 551; 341/61, 155
See application file for complete search history.

(56) References Cited

U.S. PATENT DOCUMENTS

| | | | |
|---|---|---|---|
| 2008/0062332 A1* | 3/2008 | Filliman et al. | 348/730 |
| 2008/0225174 A1* | 9/2008 | Greggain et al. | 348/572 |
| 2010/0091688 A1* | 4/2010 | Staszewski et al. | 370/277 |

* cited by examiner

*Primary Examiner* — Leon Flores
(74) *Attorney, Agent, or Firm* — Trellis IP Law Group, PC (57) ABSTRACT

As a digitized representation of an intermediate frequency television signal moves through a demodulator it undergoes a number of processes, including conversion from an analog signal to a digitized data, digital signal processing of the digitized data, and the like. The rate at which the digitized data moves through the digital signal processor of the demodulator for processing is referred to as the data rate of the DSP. The demodulator can vary the data rate based on a selected television channel, thereby reducing the level of interference at the demodulator resulting from noise.

8 Claims, 7 Drawing Sheets

DIGITAL SIGNAL PROCESSOR WITH ADJUSTABLE DATA RATE AND METHODS THEREOF

FIELD OF THE DISCLOSURE

The present disclosure relates generally to signal processing and more particularly to signal processing of radio frequency signals.

BACKGROUND

Digital signal processors are used in a wide variety of signal processing applications, including television tuners. A typical television tuner receives an analog radio frequency (RF) television signal and channel selection information indicating a channel of interest. The television tuner filters and converts the RF signal to an intermediate frequency (IF) signal that includes encoded multimedia information based on the channel selection. A demodulator converts the IF signal to baseband video and audio signals representing the encoded multimedia information. The baseband video and audio signals are provided to a decoder that decodes the baseband signals into one or more formats suitable for rendering at a display device. During generation and processing of the IF signal, the television tuner is susceptible to the introduction of noise from a number of sources. For example, noise can be introduced by electromagnetic and power supply interference resulting from digital processing of large amounts of data. The noise can have an undesirable impact on the fidelity of the baseband video and audio signals. Although such noise may be filtered from the baseband signals, such filtering can be undesirably time-consuming or resource intensive.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate devices and techniques for reducing the amount of noise introduced during digital processing of a television signal. In particular, as a digitized representation of an IF television signal moves through a demodulator it undergoes a number of processes, including conversion from an analog signal to a digitized data, digital signal processing of the digitized data, and the like. The rate at which the digitized data moves through the digital signal processor of the demodulator for processing is referred to as the data rate of the DSP. The data rate is typically at a slower frequency than the rate of the system clock signal that synchronizes the logic modules of the DSP. The slowness of the data rate relative to the system clock signal is due to a number of factors, including the complexity of arithmetic calculations performed during digital signal processing of the digitized data, requiring multiple clock cycles for each digitized sample, multiplexing of data paths for area-efficient devices, conservation of power and other resources, and the like.

Movement of input data through the DSP can introduce noise in a similar fashion as noise introduced by the demodulator clock signals. Further, noise generated by the DSP can be coupled, via the system bus or other paths, to other modules of the system. Accordingly, the noise generated by the DSP can impact the accuracy and reliability of other functions of the demodulator, including A/D conversion, filtering, and D/A conversion, thereby impacting the quality of the video and audio information output by the system. The noise generated by movement of data through the DSP is typically dependent on the data rate. Moreover, the data rate can be altered by adjusting (decimating or up-sampling) the sampling rate of the digitized data. Accordingly, the techniques described herein provide for adjusting data rate of digitized data in order to reduce the impact of noise on the operation of the system.

In particular, because the noise introduced by data moving through the demodulator can vary as a function of frequency, the amount of interference resulting from the noise varies according to the frequency band of the channel of interest. Further, the impact of the generated noise on the quality of the video and audio content provided by the system can vary according to the channel of interest. Thus, the techniques described herein vary the data rate based on a selected television channel, thereby reducing the level of interference resulting from noise related to the DSP data rate and the harmonics of the DSP data rate.

Figure 1:
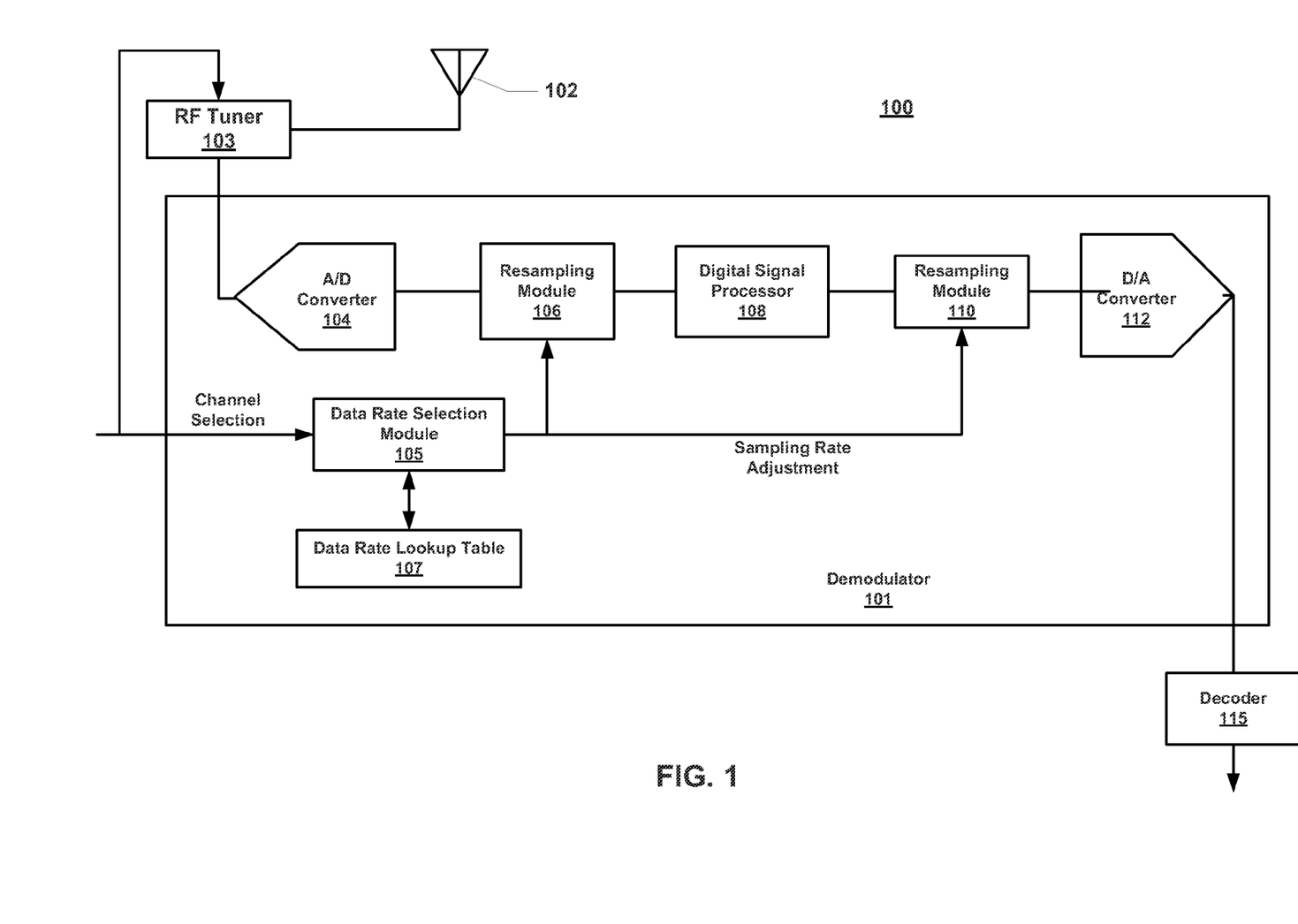
FIG. 1 is a block diagram of a television tuner in accordance with one embodiment of the present disclosure.

FIG. 1 illustrates an example television tuner 100 incorporating noise reduction techniques described herein. In operation, the television tuner 100 receives two signals to facilitate tuning to a channel of interest. In particular, as illustrated in FIG. 1, the television tuner 100 receives an analog RF signal that represents encoded multimedia information associated with a set of television channels, and a channel selection signal indicating the channel of interest. The RF television signal can be received from any of a number of sources, including via an antenna, via a coaxial cable, or other source. Similarly, the channel selection signal can be received from a remote control device, from a computer software program, or from another source. To illustrate, television tuner 100 can be incorporated in a set top box that receives the RF signal via a coaxial cable and the channel selection signal via a remote control device. As another example, the television tuner 100 can be incorporated in a television that receives the RF signal via an antenna and the channel selection signal via a channel selection device incorporated in the television.

The television tuner 100 includes a number of modules to effectuate conversion of the RF signal to one or more decoded signals suitable for rendering at a display device, such as a television or computer display. In particular, in the illustrated embodiment of FIG. 1, television tuner 100 includes an RF interface 102, an RF tuner 103, a demodulator 101, and a decoder 115. As described further herein, the television tuner 100 uses these modules to demodulate the RF signal, tune the signal to an RF band associated with the channel of interest, and downconvert the signaling within the RF band to a lower-frequency IF signal. The television tuner 100 further demodulates the IF signal to one or more baseband video and audio signals and decodes the baseband signals to one or more audio and video signals suitable for rendering at the display device. For example, in one embodiment the television tuner 100 can convert the RF signal to composite video baseband (CVBS) and audio (SIF) signals, and decode the signals to renderable audio and video signals for display.

To further illustrate, the RF interface 102 can include, for example, an antenna, a coaxial cable interface, or other interface that receives an RF signal carrying encoded multimedia information associated with a set of television channels. The RF tuner 103 tunes the RF signal to the RF band indicated by the channel selection signal, and downconverts the signaling within the RF band to the lower-frequency IF signal. The demodulator 101 demodulates the IF signal to one or more baseband video and audio signals. In the course of demodulation, the demodulator 101 can perform a number of functions, including signal filtering, adjacent channel rejection, and other functions to enhance the fidelity of the baseband video and audio signals. Decoder 115 converts the baseband signals into video and audio signals that can be rendered at a television or other display device. In other embodiments, the demodulator 101 can be replaced by a similar module that is a channel selection filter, with demodulation being performed at the decoder 115.

In the illustrated embodiment, demodulator 101 includes a number of modules to facilitate conversion of the IF signal to the baseband signals. In particular, in the illustrated embodiment of FIG. 1, demodulator 101 includes an analog-to-digital (A/D) converter 104, a resampling module 106, a digital signal processor (DSP) 108, a resampling module 110, a digital-to-analog (D/A) converter 112, a data rate selection module 105, and a data rate lookup table 107. The A/D converter 104 receives the analog IF signal from RF tuner 103 and converts the signal to a series of digitized samples. In an embodiment, the A/D converter 104 is implemented as a sampling module that periodically samples the received RF signal, and a converter module that converts each sample into a digital value, referred to as a digitized sample. The rate at which the A/D converter 104 takes samples is referred to as the initial sampling rate, and is typically synchronized by the clock speed of a sampling clock signal (not shown) provided to the A/D converter 104. Accordingly, the number of digitized samples provided the A/D converter 104 depends on, and is indicative of, the initial sample rate.

The resampling module 106 is operable to adjust the sampling rate of the digital signal represented by the received digitized samples in order to prepare the samples for further processing by the DSP 108. For example, it can be useful to sample the received RF signal at a relatively high initial sampling rate in order to simplify the design of the filtering and sampling modules of A/D converter 104. This results in a relatively higher number of samples than are needed in order to achieve desired signal fidelity at the output of the demodulator 101. Accordingly, the resampling module 106 can reduce (decimate) the number of digitized samples for subsequent processing. In the illustrated embodiment, the resampling module 106 is dynamically configurable, whereby the amount of decimation or up-sampling implemented by the module is dependent upon information provided by a sampling rate adjustment signal. This provides for control of the data rate at which data moves through the DSP 108, based upon the data rate based on the selected channel of interest, as described further herein.

The digital signal processor 108 receives and processes digitized samples to convert the digital signal represented by the samples to one or more baseband video and audio signals. The DSP 108 can also perform other functions, such as noise reduction, adjacent channel rejection, automatic gain control, carrier recovery, and other signal processing functions. The DSP 108 is configured to adjust its processing based on the sample rate of the digitized samples in order to maintain a threshold fidelity for the baseband video and audio signals. For example, the DSP 108 can employ one filter to process the digitized samples when the samples are at a first sampling rate, and employ a different filter when the samples are at a different sampling rate. The DSP 108 can also adjust loop gain and other parameters based on the sampling rate of the received digitized samples.

Resampling module 110 is operable to adjust the sampling rate of digitized samples received from the DSP 108 to prepare the samples for conversion to an analog signal. Thus, for example, the resampling module can up-sample the received digitized samples, according to an interpolation procedure, in order to achieve an appropriate number of samples for conversion of the samples to an analog signal at a desired fidelity. In addition, resampling module 110 can perform digital filtering and other processing to prepare the samples for the conversion process.

D/A converter 112 is operable to receive digitized samples and convert the digitized samples to an analog signal. In the illustrated embodiment, the analog signal at the output of D/A converter 112 represents a baseband video signal suitable for decoding at the decoder 115.

As indicated above, resampling module 106 is configurable, based on the sampling rate adjustment signal, to set the rate at which data is received at and moves through the DSP 108. Data rate selection module 105, in conjunction with data rate lookup table 107, determines the data rate based on the channel of interest indicated by the channel selection signal. To illustrate, data rate lookup table 107 stores sampling rates associated with channels of interest. In operation, data rate selection module 105 accesses the data rate lookup table to determine a data rate for the channel of interest indicated by the channel selection signal. By setting the data rate individually for each channel of interest, the data rate selection module 105 can reduce interference due to data moving through the DSP 108. This can be better understood with reference to FIGS. 2 and 3.

Figure 2:
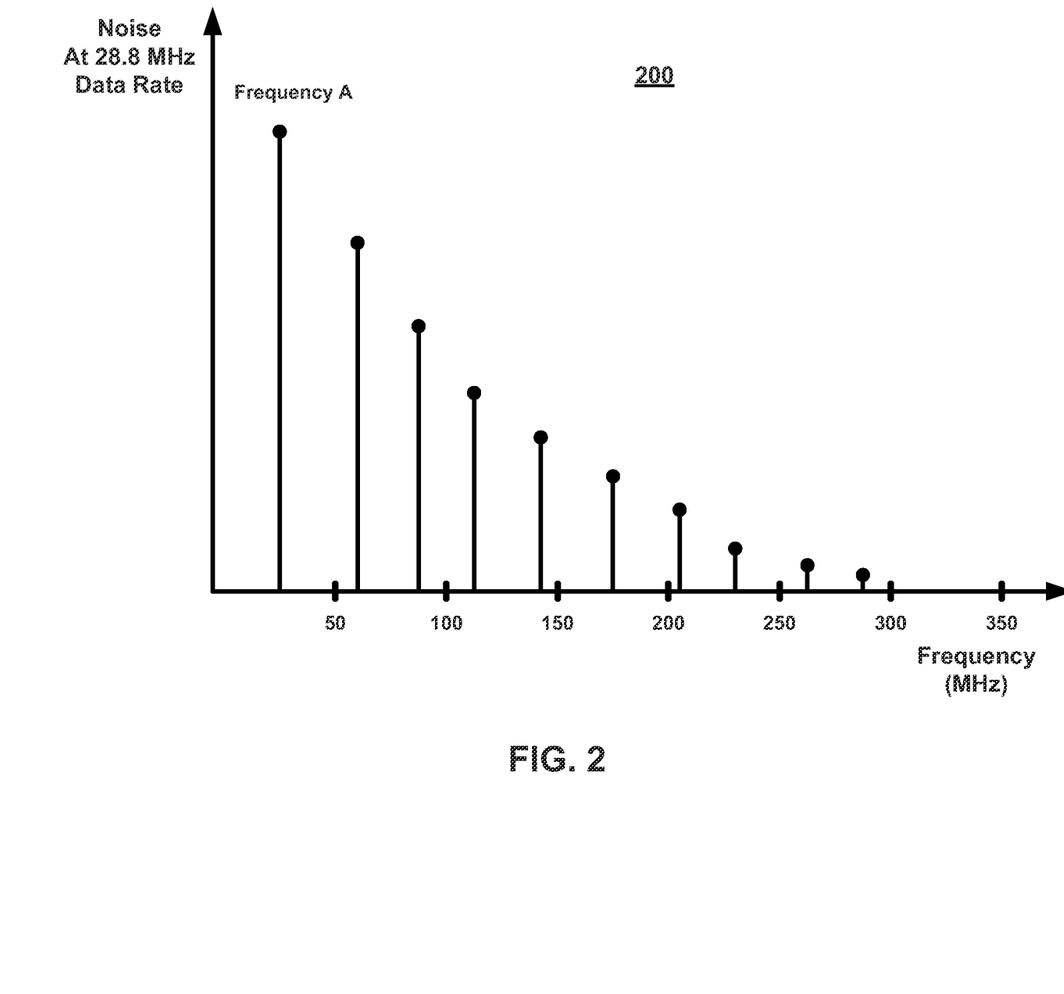
FIG. 2 is a diagram of a frequency versus noise curve associated with a particular embodiment of the television tuner of FIG. 1.

FIG. 2 illustrates a diagram of a frequency versus noise curve 200 for the television tuner 100 in accordance with one embodiment of the present disclosure. In the illustrated example of FIG. 2, the x-axis represents frequency and the y-axis represents the amount of noise present assuming the data rate of the DSP 108 is 28.8 MHz. The noise can represent noise on a power supply voltage line for the television receiver device 100, a ground line of the receiver device, noise present at the input or output of the receiver device, or any combination thereof. As illustrated by curve 200, the amount of noise present for a particular data rate varies with frequency. Thus, in the illustrated example, there is a relatively large amount of noise present at a frequency band around Frequency A and its harmonics, and a relatively small amount of noise at frequencies that are not a harmonic of frequency B. Accordingly, curve 200 indicates that, assuming a data rate of 28.8 MHz at the television tuner 100, a relatively large amount of interference can be expected in the event that the channel indicated by the channel selection signal is in the Frequency A band.

Figure 3:
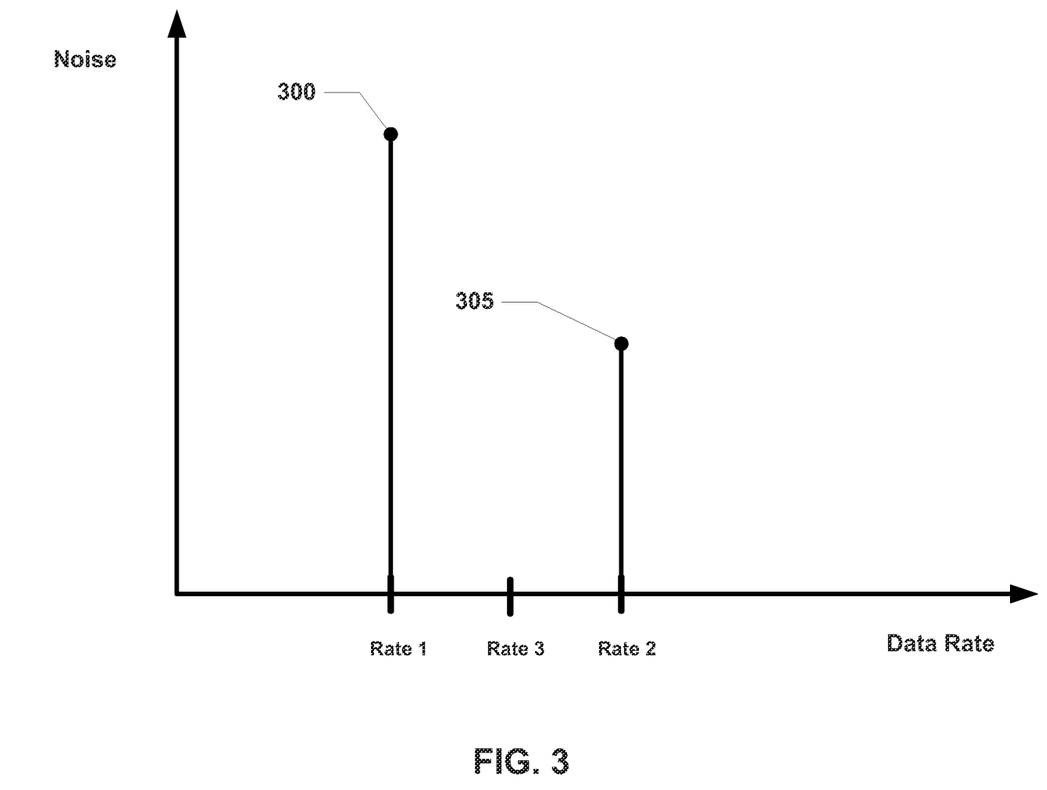
FIG. 3 is a diagram of a data rate versus noise chart associated with a particular embodiment of the television tuner of FIG. 1.
Figure 4:
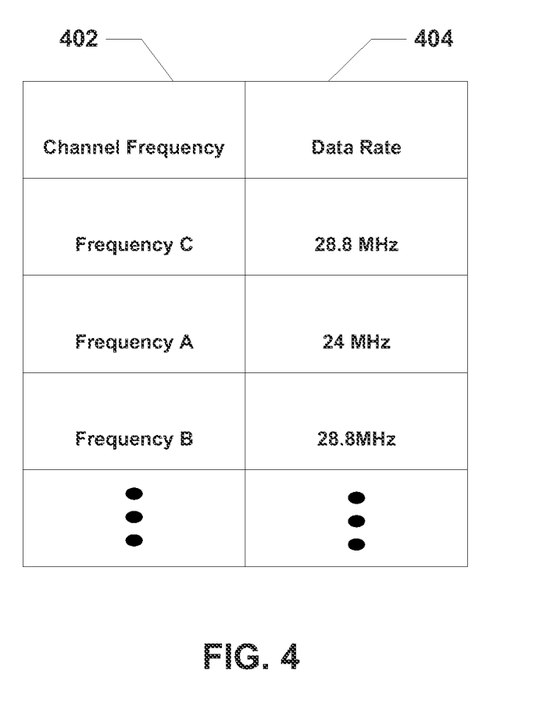
FIG. 4 is a diagram of the data rate lookup table of FIG. 1 in accordance with one embodiment of the present disclosure.

FIG. 3 illustrates a data rate versus noise chart for the television receiver device 100 in accordance with another embodiment of the present disclosure. In the illustrated example of FIG. 3, the x-axis represents the data rate of the DSP 108 and the y-axis represents the amount of noise present if the channel of interest is at Frequency A. Thus, points 300 and 305 respectively illustrate the amount of noise assuming the data rate is at a rate labeled Rate1 or at a rate labeled Rate2. Rate1 and Rate2 can be the same as or a harmonic of Frequency A. In another embodiment, neither Rate1 nor Rate 2 is a harmonic of Frequency A, but mixing effects from other modules in the system, such as the tuner 103 and the decoder 115, result in a relatively high amount of noise being present when the data rate is at Rate1 or Rate2. FIG. 3 further illustrates the mixing products of the data rate frequency with the other modules of the system will have a relatively small impact on the output if the channel of interest is at a rate labeled Rate3. Accordingly, the examples of FIGS. 2. and 3 together indicate that the amount of potential interference resulting from noise can be reduced by ensuring that the data rate, when the requested channel is in the Frequency A band, is not at Rate1 or Rate2. However, in an embodiment, potential interference is not substantially changed by having the data rate at Rate1 or Rate2 if the requested channel is not in the Frequency A band or a harmonic thereof. Further, the Rate1 data rate can be generally desirable, for example, to simplify the design or operation of DSP 108. To illustrate, the DSP 108 may have been designed and tested to operate more efficiently with a Rate1 data rate than at other frequencies. Accordingly, the television receiver 100 can adjust the data rate based on the requested channel, so that for requested channel bands that are likely to cause interference at the nominal data rate, the data rate is adjusted.

To illustrate, during operation of the television tuner 100, the data rate selection module 105 accesses the data rate lookup table 107 based on the channel of interest indicated by the channel selection signal. The data rate lookup table 107 indicates a data rate for each channel frequency band. This can be better understood with reference to FIG. 4, which illustrates a data rate lookup table 400 in accordance with one embodiment of the present disclosure. Data rate lookup table 400 includes a column 402, whereby each entry of column 402 indicates a channel band frequency, and a column 404, whereby each entry of column 404 indicates an associated data rate. Thus, in the illustrated example of FIG. 4, channel band frequencies Frequency C and Frequency B are each associated with a data rate of 28.8 MHz, while channel band frequency Frequency A is associated with a data rate of 24 MHz.

Returning to FIG. 1, the data rate selection module accesses the data rate lookup table 107 to determine the data rate associated with the channel indicated by the channel selection signal. The data rate selection module 105 then sets the data rate at DSP 108 to the rate indicated by the table 107. In particular, the data rate selection module 105 provides information, via the sampling rate adjustment signal, to resampling module 106 to adjust the sampling rate of the digital signal in order to achieve the indicated data rate. In addition, the data rate selection module 105 indicates the data rate to the resampling module 110, so that the module can make any commensurate adjustments to the sampling rate of processed samples provided by the DSP 110. For example, if the data rate selection module 105 indicated to the resampling module 106 that the digitized samples should be decimated by a particular factor to achieve a designated sample rate, resampling module 100 can up-sample the processed samples by a commensurate amount.

By setting individually the data rate for each requested channel, the television receiver device 100 can reduce the amount of potential interference for channels where the amount of interference is likely to be relatively high. In addition, the television receiver device 100 can set the data rate to a more efficient level for those channels where the amount of interference is expected to be low, thereby improving the noise sensitivity of the device while maintaining processing efficiency.

Figure 5:
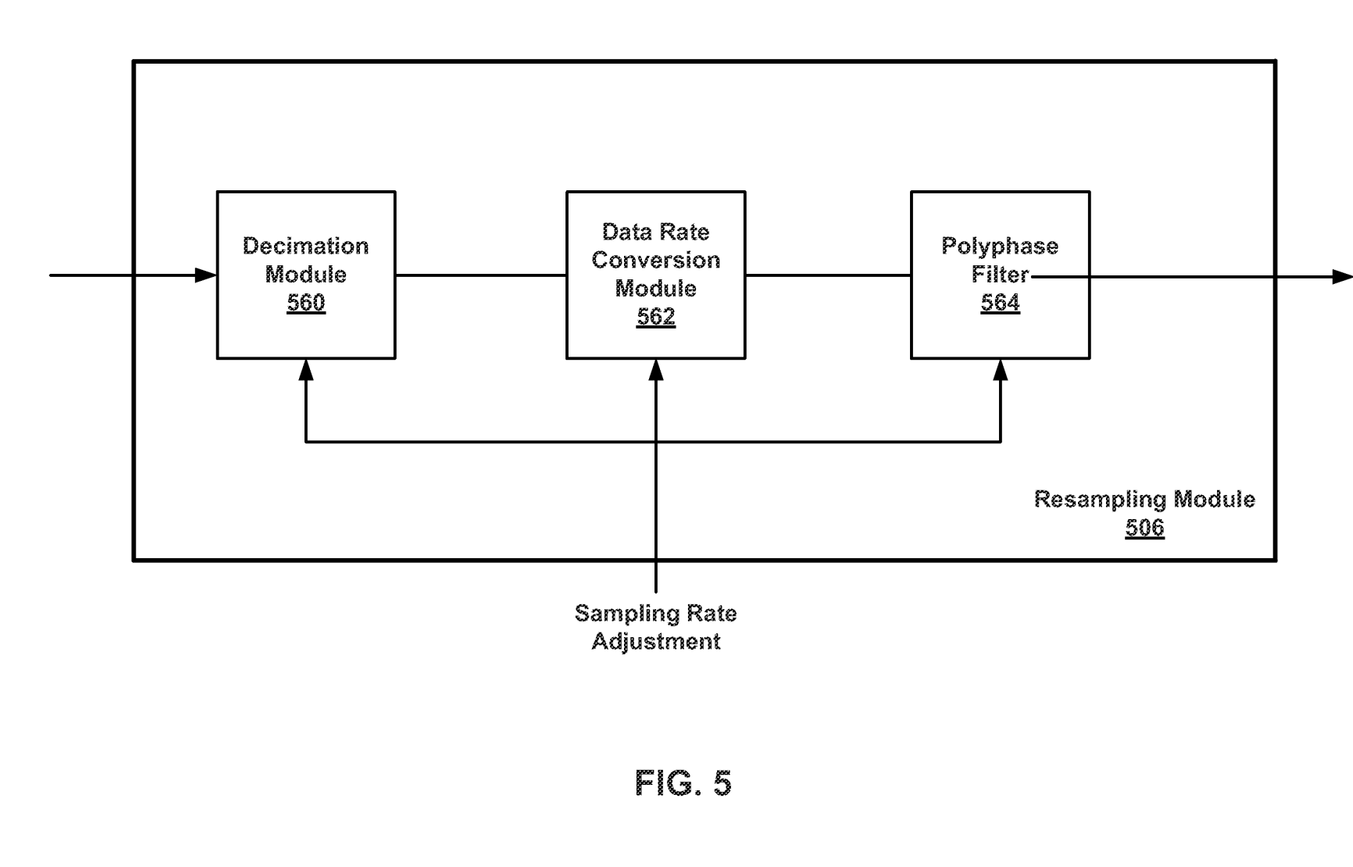
FIG. 5 is a block diagram of a resampling module of FIG. 1 in accordance with one embodiment of the present disclosure.

FIG. 5 illustrates a resampling module 506, corresponding to the resampling module 106 of FIG. 1 in accordance with one embodiment of the present disclosure. In the illustrated embodiment of FIG. 5, the resampling module 506 is operable to perform a number of functions, including decimation of a received set of digitized samples to a nominal sampling rate, adjustment of the sampling rate from the nominal rate to an adjusted rate, and filtering of the digitized samples. In particular, resampling module 506 includes a decimation module 560, a data rate conversion module 562, and a polyphase filter 564. Decimation module 560 is operable to receive the digitized samples from the A/D converter 104 and decimate the samples to a nominal sampling rate. In an embodiment, the nominal sampling rate is associated with the rate at which operations of the DSP 108 are expected to be relatively more efficient. The data rate conversion module 562 is operable to adjust the sampling rate of the digitized samples provided by decimation module 560 to the rate indicated by the sampling rate lookup table 107. In an embodiment, for some channels of interest, the data rate conversion module 562 will not adjust the sampling rate, but leaves the rate at the nominal rate. For other channels of interest, such as those expected to be subject to an undesirable amount of noise interference for a given data rate, the data rate conversion module 562 decimates or up-samples the digitized samples to an adjusted sampling rate, as indicated by the sampling rate adjustment signal. Polyphase filter 564 is configured to filter the digitized samples for preparation for processing at the DSP 108. In an embodiment, polyphase filter 564 is a lowpass anti-aliasing filter that filters aliasing effects resulting from the analog-to-digital conversion and sampling rate adjustment processes.

It will be appreciated that, although for purposes of illustration the data rate conversion module 562 is indicated as a separate module from the decimation module 560 and the polyphase filter 564, in some embodiments the sampling rate adjustment can be implemented at the decimation module 560, at the polyphase filter 564, or at a combination thereof. For example, the sampling rate of the digital signal can be adjusted partially at the decimation module 560 and partially at the polyphase filter 564 in order to achieve the adjustment indicated by the sampling rate adjustment signal. To illustrate, polyphase filter 564 can be configurable to discard designated ones of received digitized samples without filtering, thereby effectively decimating the samples. In an embodiment, the parameters of the polyphase filter 564 can be adjusted based on the sampling rate adjustment signal to determine which of the digitized samples are discarded to adjust the decimation rate. Similarly decimation module 560 can be configurable to decimate the digitized samples at a rate based on the sampling rate adjustment signal.

Figure 6:
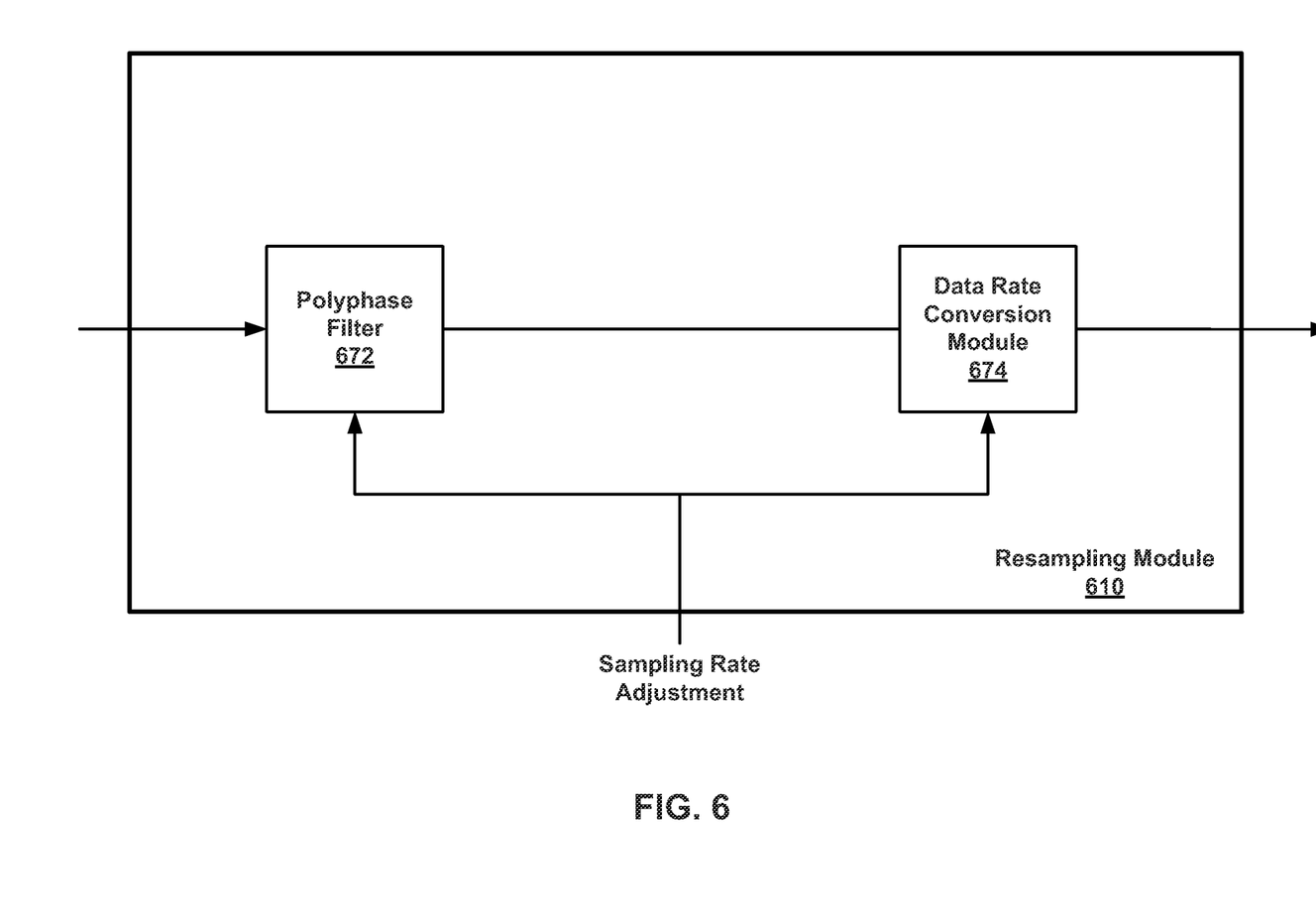
FIG. 6 is a block diagram of a resampling module of FIG. 1 in accordance with another embodiment of the present disclosure.

Referring to FIG. 6, a resampling module 610 is illustrated, corresponding to the resampling module 110 of FIG. 1 in accordance with one embodiment of the present disclosure. In the illustrated embodiment of FIG. 6, the resampling module 610 is operable to filter digitized samples received from the DSP 108, and adjust the sampling rate of the digital signal to a rate expected by D/A converter 112. In particular, resampling module 610 includes a polyphase filter 672 and a data rate conversion module 674. Polyphase filter 672 is operable to filter digitized samples received from DSP 108 and provide filtered samples at a sampling rate dependent on the sampling rate set at the resampling module 106 (FIG. 1). Data rate conversion module 674 converts the sampling rate of the digitized samples provided by the polyphase filter 672 to the sampling rate expected by the D/A converter 112. In an embodiment, the data rate conversion module 674 effectively undoes any adjustment in the sampling rate effected at resampling module 106 from a nominal rate. To illustrate, the nominal sampling rate for the DSP 108 can be 28.8 MHz. However, as described herein for some channels of interest, resampling module 106 adjusts the sampling rate to 24 MHz. Accordingly, for channels associated with the nominal rate of 28.8 MHz, the data rate conversion module 674 does not adjust the sampling rate of received samples. For channels associated with the 24 MHz sampling rate, the data rate conversion module 674 up-samples received digitized samples to the rate expected by the D/A converter 112. It will be appreciated that, although for purposes of illustration the data rate conversion module 674 is indicated as a separate module from the polyphase filter 672, in some embodiments all or part of the sampling rate adjustment can be implemented by adjusting the parameters to the polyphase filter based on the sampling rate adjustment signal. Further, in another embodiment the data rate conversion module 674 can include additional modules, such as an upsampling module, to converting the sampling rate at the output of the data rate conversion module 112 to the rate expected by the D/A converter 112.

Figure 7:
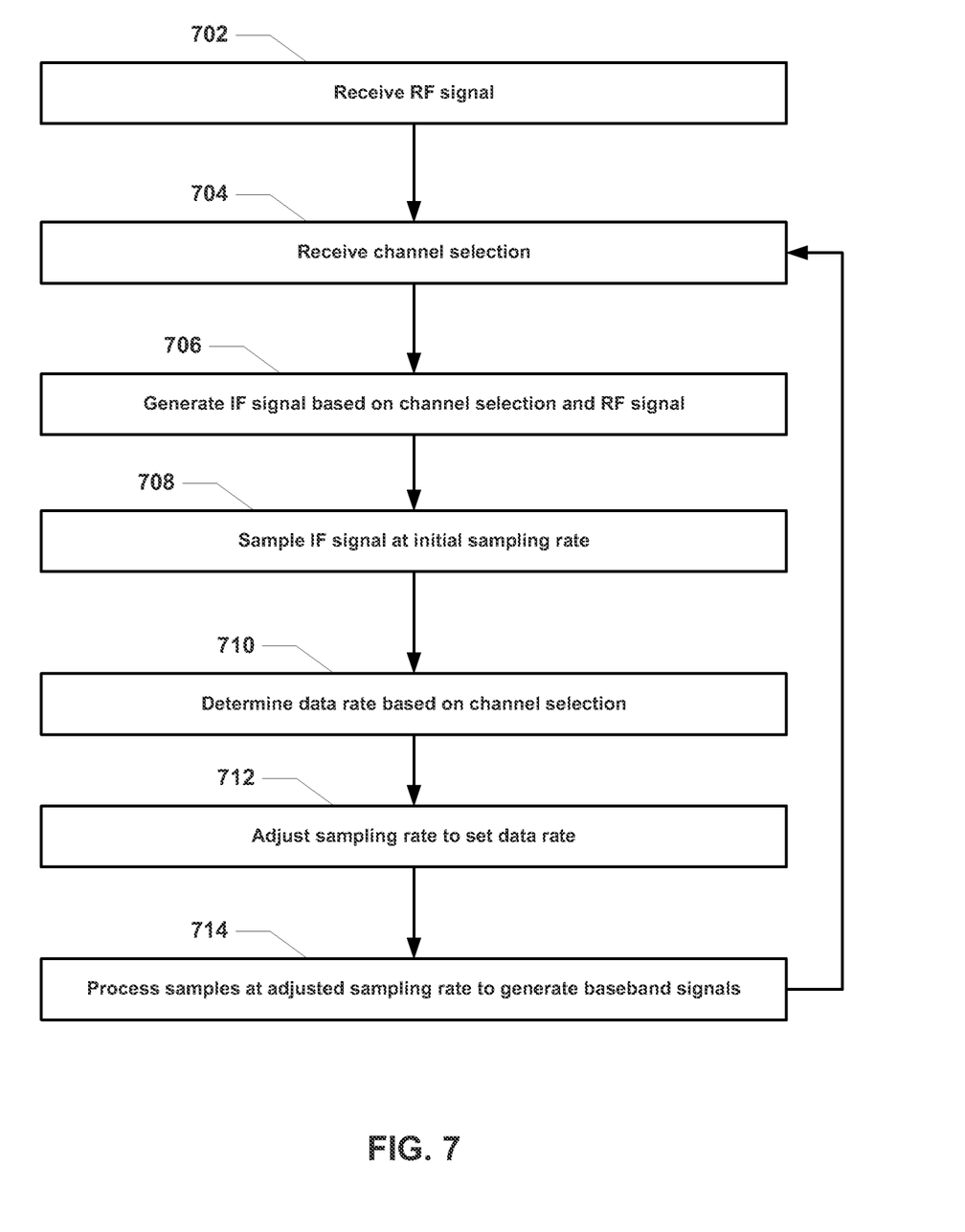
FIG. 7 is a flow diagram of a method of adjusting the data rate at the television tuner of FIG. 1 in accordance with one embodiment of the present disclosure.

FIG. 7 illustrates a flow diagram of a method of adjusting the data rate at the television tuner 100 in accordance with one embodiment of the present disclosure. At block 702, an RF signal incorporating encoded multimedia information associated with a set of channels is received at the television tuner 100. At block 704 the television tuner 100 receives a channel selection indicating a channel of interest. At block 706, the RF tuner 103 processes the RF signal based on the channel selection to generate an IF signal. At block 708, the A/D converter 104 samples the IF signal at the initial sample rate and converts the samples to digitized samples representing a digital signal having the initial sampling rate. At block 710, the data rate selection module accesses the data rate lookup table 107 to determine the data rate associated with the channel selection. At block 712, the resampling module adjusts the sampling rate of the digitized samples to set the data rate to the rate indicated by data rate lookup table 107. At block 714, the DSP 108 processes the digitized samples at the adjusted sampling rate to generate digitized baseband signals for conversion by the D/A converter 112.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method, performed by a data rate selection module, of reducing noise in a multimedia system, where the data rate selection module is coupled to a resampling module configured to resample an intermediate frequency (IF) signal demodulated from a radio frequency (RF) signal at a selected channel indicated by a channel selection signal which indicates a selected channel, where a digital IF signal is output from an analog-to-digital (A/D) converter at an initial sampling rate and with the data rate selection module coupled to a digital signal processor (DSP) where the DSP is designed to operate at maximum efficiency at a first data rate, the method comprising:
   receiving data rate adjustment information based on the channel selection signal, where the data rate adjustment signal indicates a second data rate, where the second data rate is different from the first data rate only if operation of the DSP at the first data rate causes high noise in the multimedia system when tuned to the selected channel and if operation of the DSP at the second data rate reduces noise in the multimedia system when tuned to the selected channel;
   adjusting the initial sampling rate to the second data rate; and
   controlling the DSP to operate at the second data rate.

2. The method of claim 1 where adjusting the initial sampling rate further comprises:
   decimating the digital IF signal to adjust the initial sampling rate to the second data rate.

3. The method of claim 1 where adjusting the initial sampling rate further comprises:
   discarding samples when filtering the digital IF signal to adjust the initial sampling rate to the second data rate.

4. The method of claim 1 where receiving data rate adjustment information further comprises:
   receiving information from a look up table storing second data rates associated with selected channels.

5. A device, comprising:
   an analog-to-digital (A/D) converter to convert a received analog intermediate frequency (IF) signal to a first set of samples at a first sampling rate, the first set of samples representing a digital IF signal and with the analog IF signal modulated from a radio frequency (RF) signal at a selected channel indicated by a channel selection signal;
   a digital signal processor (DSP) configured to operate at maximum efficiency at a first data rate; and
   a resampling module having a signal input coupled to an output of the A/D converter, a control input to receive information indicative of a second data rate based on the channel selection, and an output coupled to the DSP, where the second data rate is different from the first data rate only if operation of the DSP at the first data rate causes high noise in the multimedia system when tuned to the selected channel and if operation of the DSP at the second data rate reduces noise in the multimedia system when tuned to the selected channel, and with the resampling module configured to adjust the initial sampling rate to the second data rate and configured to control the DSP to operate at the second data rate.

6. The device of claim 5 further comprising:
   a lookup table coupled to the channel selection module, the lookup table configured to provide the information indicative of a second data rate based on the channel selection.

7. The device of claim 5 with the resampling module further comprising:
   a decimation module configured to decimate the digital IF signal to adjust the initial sampling rate to the second data rate.

8. The device of claim 5 with the resampling module further comprising:

a polyphase filter configured to discard samples when filtering the digital IF signal to adjust the initial sampling rate to the second data rate;

receiving an intermediate frequency (IF) signal associated with a first selected channel; and changing a data rate of the IF signal associated with the first selected channel at a selected data rate, the selected data rate based on the selected channel.

\* \* \* \* \*